United States Patent [19]
Arai

[11] Patent Number: 5,406,561
[45] Date of Patent: Apr. 11, 1995

[54] TIME-DIVISION MULTIPLEX COMMUNICATION SYSTEM

[75] Inventor: Koju Arai, Tokyo, Japan

[73] Assignee: NEC Corporation, Tokyo, Japan

[21] Appl. No.: 869,469

[22] Filed: Apr. 15, 1992

[30] Foreign Application Priority Data

Apr. 19, 1991 [JP] Japan .................. 3-087073

[51] Int. Cl.⁶ .................. H04B 3/36; H04J 3/06
[52] U.S. Cl. .................. 370/97; 370/100.1
[58] Field of Search .................. 370/97, 103, 100.1, 370/13, 13.1, 104, 15; 375/107, 108; 455/18; 379/4

[56] References Cited

U.S. PATENT DOCUMENTS

| 4,490,818 | 12/1984 | Otsuka | 455/18 |
| 4,494,211 | 1/1985 | Schwartz | 375/107 |
| 4,611,324 | 9/1986 | Giacometti et al. | 370/13 |
| 4,713,809 | 12/1987 | Mizota | 370/97 |
| 4,876,683 | 10/1989 | Suzuki | 370/97 |
| 4,937,812 | 6/1990 | Itoh et al. | 370/13.1 |

FOREIGN PATENT DOCUMENTS 153016 12/1990 Japan .

Primary Examiner—Douglas W. Olms
Assistant Examiner—Chau T. Nguyen
Attorney, Agent, or Firm—Ostrolenk, Faber, Gerb & Soffen

[57] ABSTRACT

Each of the repeater stations comprises a frame synchronization circuit, a loop-back circuit and a repeater number calculating circuit. The repeater number calculating circuit calculates the second repeater number thereof depending on the number of layers from the master station based on the first repeater number when the repeater station is in frame synchronization as determined by the frame synchronization circuit. The repeater number calculating circuit equalizes the second repeater number thereof to the first repeater number irrespective of the number of layers from the master station when the repeater station is in frame asynchronization as determined by the frame synchronization circuit.

7 Claims, 6 Drawing Sheets or stations R, and an up burst signal is transmitted from the slave station T, which is permitted to transmit the signal, to the master station B directly or through the repeater station or stations R.

TIME-DIVISION MULTIPLEX COMMUNICATION SYSTEM

BACKGROUND OF THE INVENTION

The present invention relates to a time-division multiplex communication system.

FIG. 1 shows one time-division multiplex communication system disclosed in Japanese patent application No. 1990-153016. The disclosed time-division multiplex communication system comprises a single master station B, a plurality of repeater stations R, and a plurality of slave stations T, these stations B, R, T being connected in a hierarchical network. The master station B and any one of the slave stations T communicate with each other when a down frame signal indicating the station number of the slave station T is transmitted from the master station B to the slave station T directly or through a repeater station or stations R, and an up burst signal is transmitted from the slave station T, which is permitted to transmit the signal, to the master station B directly or through the repeater station or stations R.

In the time-division multiplex communication system, to prevent up burst signals transmitted by plural repeater stations R and plural slave stations T from overlapping in time, the up burst signals are adjusted with respect to delay times by the repeater stations R and the slave stations T, as follows: To compensate for the difference between radio wave delays due to the distance between the stations, the up burst signal are delayed depending on the distance between the stations. To compensate for the difference between radio wave delays due to the difference between the numbers of layers or levels from the master station B, the up burst signals are delayed by certain times depending on the number of layers from the master station B. In order for each of the repeater and slave stations R, T to be able to automatically recognize its number of layers from the master station B, the master station B transmits a down frame signal with a repeater number, and the repeater number is incremented by "1" in each of the repeater and slave stations R, T.

Each of the repeater stations of the proposed time-division multiplex communication system has a loop-back function to allow slave stations to communicate with each other in the event of a failure of a repeater station. If a repeater station $R_1$ in the first layer of a time-division multiplex communication system shown in FIG. 2 fails to operate, a repeater station $R_2$ in the second layer loses frame synchronization or is in frame asynchronization because it cannot receive a down frame signal from the repeater station $R_1$. At this time, the repeater station $R_2$ performs its loop-back function to generate a substitute down frame signal by itself, and transmits signals, which are composed of the substitute down frame signal with up burst signals from slave stations $T_1$–$T_3$, to the slave stations $T_1$–$T_3$. As a result, there is established a network with the repeater station $R_2$ acting as a virtual master station, allowing the slave stations $T_1$–$T_3$ to communicate with each other.

The early time-division multiplex communication system is however disadvantageous in that its hardware arrangement is relatively large in scale due to a delay circuit required by each of the repeater stations to delay an up burst signal from a slave station into timed relationship to its own substitute down frame signal when they are added to each other by the loop-back function.

SUMMARY OF THE INVENTION

An object of the present invention is to provide a time-division multiplex communication system which does not require each repeater station to delay an up burst signal from a slave station when the up burst signal and a down frame signal are added to each other by a loop-back function.

Other objects of the present invention will become obvious from the following description.

According to the present invention, there is provided a time-division multiplex communication system comprising; a master station for transmitting a first down frame signal accompanied by a predetermined first repeater number, a group of repeater stations each for transmitting a second down frame signal accompanied by a second repeater number, and a group of slave stations each for transmitting an up burst signal which is delayed by a fixed delay time corresponding to a third repeater number that is calculated by adding a predetermined number to a second repeater number transmitted from a repeater station which is a master with respect thereto. The master, repeater, and slave stations are connected at different layers in a hierarchical network. Each of the repeater stations comprises frame synchronization determining means for determining whether to be in frame synchronization or frame asynchronization; loop-back means for looping back the up burst signal transmitted from either one of the slave stations or another of the repeater stations which is a slave with respect thereto, when the frame synchronization determining means determines to be in frame asynchronization, and repeater number calculating means for calculating a second repeater number thereof depending on a number of layers from the master station based on the first repeater number when the frame synchronization determining means determines to be in frame synchronization, and for equalizing the second repeater number thereof to the first repeater number irrespective of the number of layers from said master station when the frame synchronization determining means determines to be in frame asynchronization.

BRIEF DESCRIPTION OF THE DRAWINGS

The features and advantages of the invention will become apparent from the following description when taken in conjunction with the accompanying drawings in which.

DETAILED DESCRIPTION OF THE PREFERRED EMBODIMENT

Figure 1:
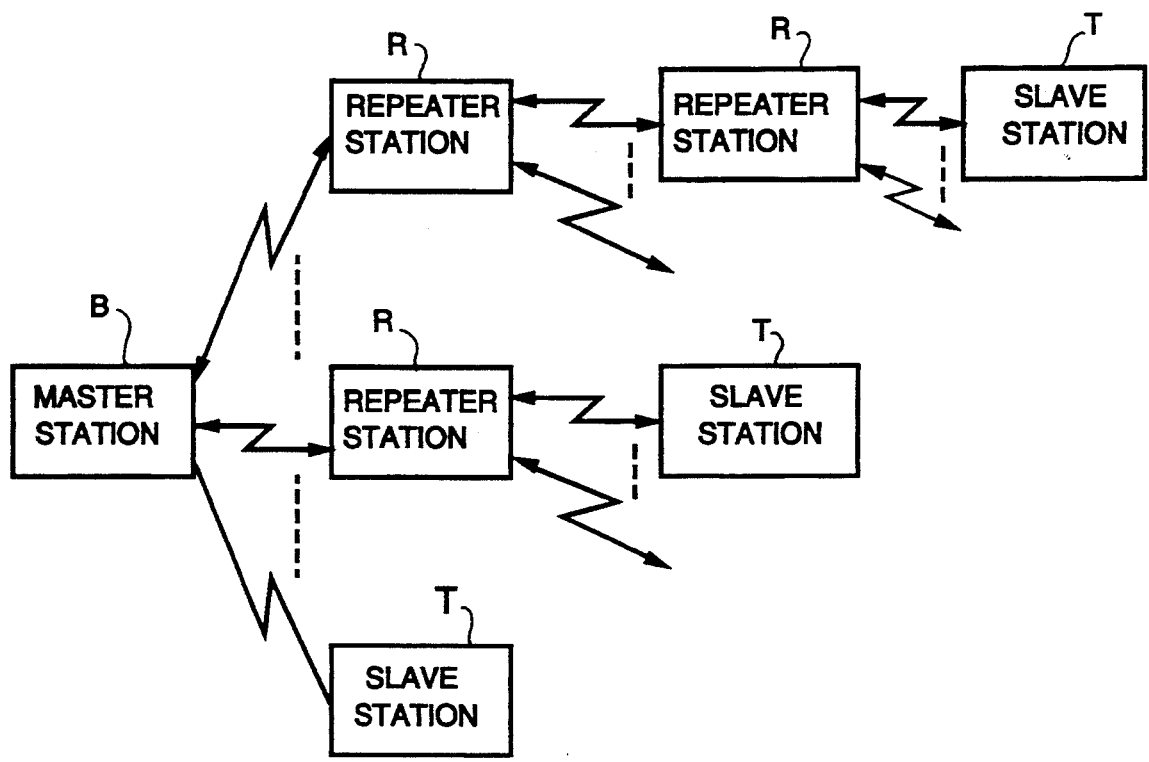
FIG. 1 is a block diagram of a conventional time-division multiplex communication system.
Figure 2:
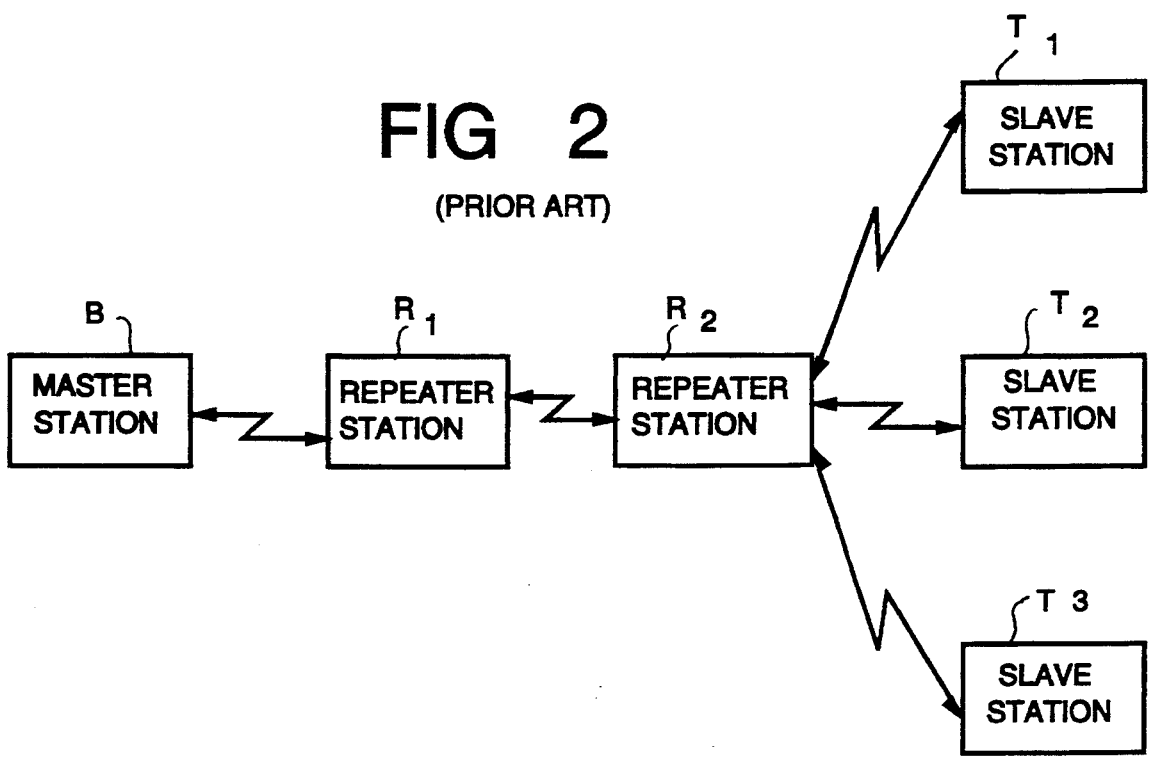
FIG. 2 is a block diagram illustrative of the loop-back function of each of repeater stations of the time-division multiplex communication system shown in FIG. 1.
Figure 3:
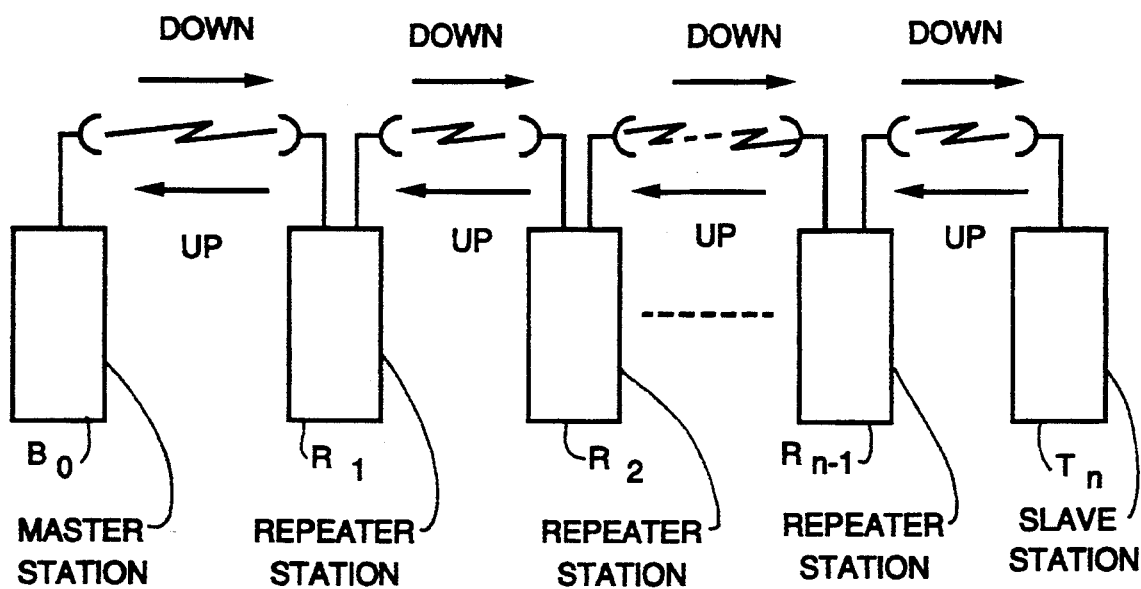
FIG. 3 is a block diagram of a time-division multiplex communication system according to the present invention.

FIG. 3 shows a time-division multiplex communication system according to the present invention. The time-division multiplex communication system shown in FIG. 3 comprises a master station $B_0$, (n−1) repeater stations $R_1$-$R_{n-1}$ connected in series to the master station $B_0$, and a slave station $T_n$ connected to the (n−1)th repeater station $R_{n-1}$.

Figure 4:
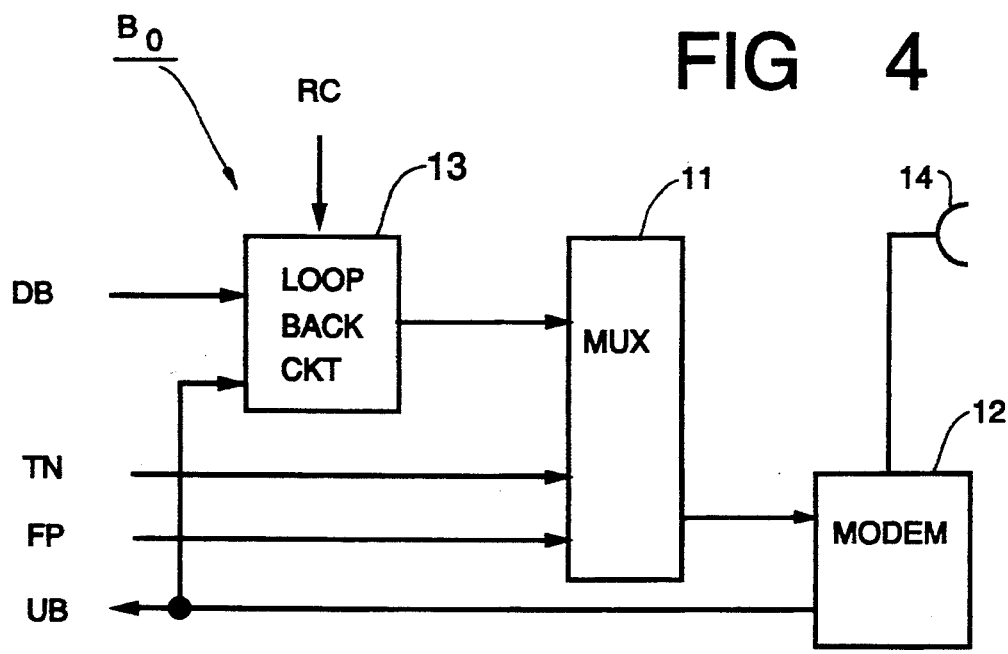
FIG. 4 is a block diagram of a master station of the time-division multiplex communication system shown in FIG. 3.

As shown in FIG. 4, the master station $B_0$ includes a multiplexer 11, a modulator-demodulator 12, a loop-back circuit 13, and an antenna 14. The master station $B_0$ also includes a down baseband signal generator (not shown) for generating a down baseband signal DB, a repeater number signal generator (not shown) for generating a repeater number signal TN, a frame pulse generator (not shown) for generating a frame pulse FP, a loop-back control signal generator (not shown) for generating a loop-back control signal RC, and an up burst signal processor (not shown) for processing an up burst signal UB.

Figure 5:
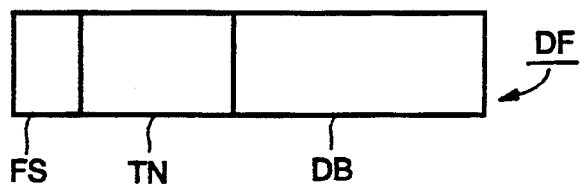
FIG. 5 is a diagram showing the format of a down frame signal DF.

The multiplexer 11 adds a frame synchronization pattern FS and the repeater number signal TN to the down baseband signal DB from the loop-back control circuit 13 using the frame pulse FP as a reference, thereby generating a down frame signal DF shown in FIG. 5. The repeater number signal TN is representative of a predetermined repeater number $RN_0$ of the master station $B_0$.

Figure 6:
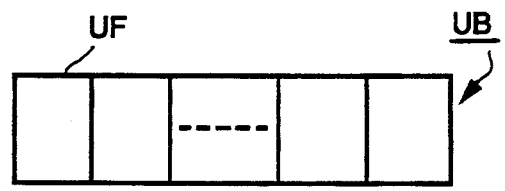
FIG. 6 is a diagram showing the format of an up burst signal UB.

The modulator-demodulator 12 modulates an output signal from the multiplexer 11 into a down signal in a radio frequency range, which is transmitted through the antenna 14 to the first repeater station $R_1$. The modulator-demodulator 12 also demodulates an up signal in a radio frequency range, received by the antenna 14, into a up burst signal UB shown in FIG. 6.

The loop-back circuit 13 supplies either the down baseband signal DB as it is to the multiplexer 11 or a signal composed of the down baseband signal DB and the up burst signal UB to the multiplexer 11 depending on the loop-back control signal RC applied to the loop-back circuit 13.

Figure 7:
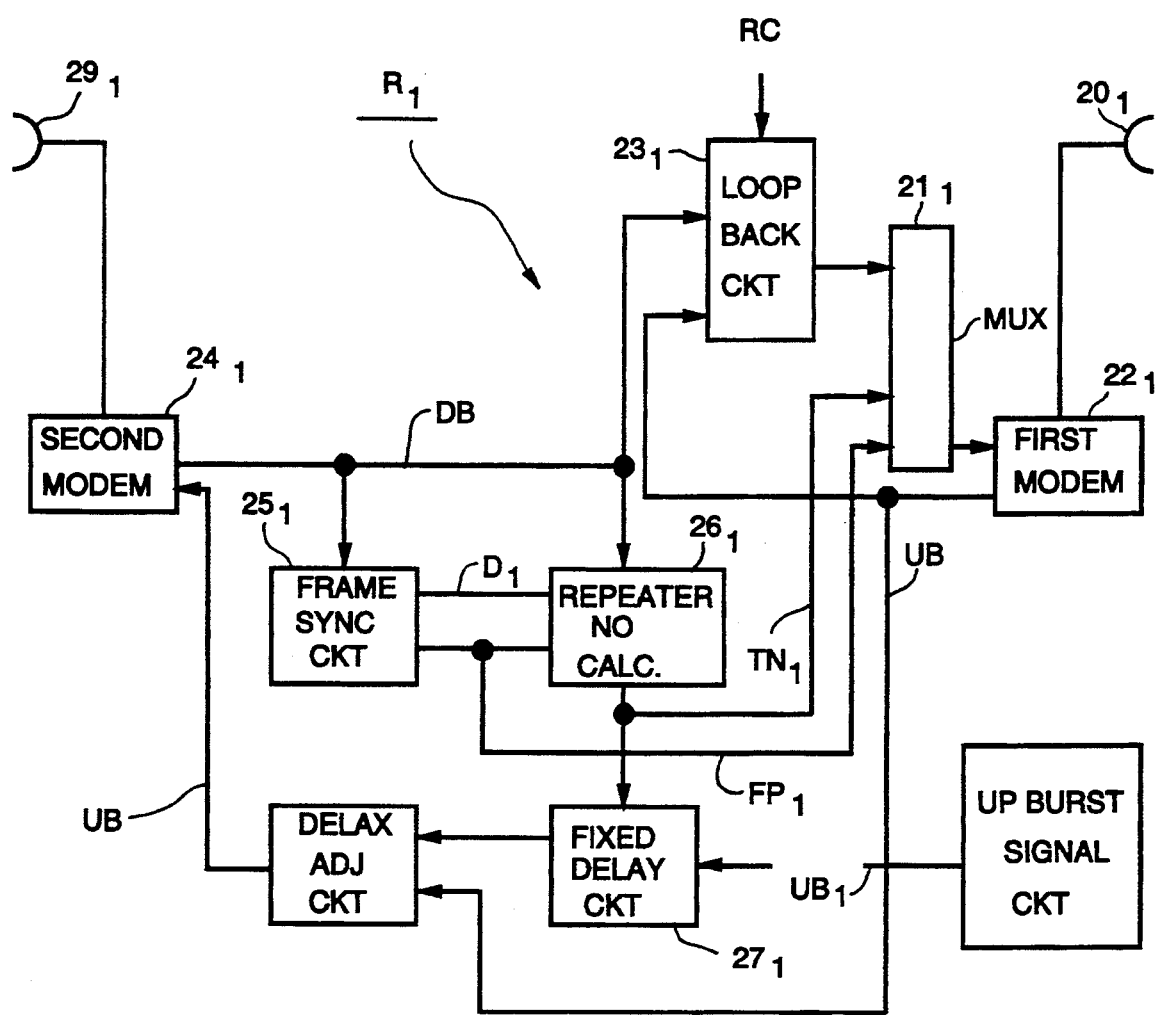
FIG. 7 is a block diagram of a first repeater station of the time-division multiplex communication system shown in FIG. 3.

As shown in FIG. 7, the first repeater station $R_1$ comprises a first antenna $20_1$, a multiplexer $21_1$, a first modulator-demodulator $22_1$, a loop-back circuit $23_1$, a second modulator-demodulator $24_1$, a frame synchronization circuit $25_1$, a repeater number calculating circuit $26_1$, a fixed delay circuit $27_1$, a delay adjusting circuit $28_1$, a second antenna $29_1$, a loop-back control signal generator (not shown) for generating a first loop-back control signal $RC_1$, and an up burst signal generator ($15_1$) for generating a first up burst signal $UB_1$. The second modulator-demodulator $24_1$ demodulates a down signal in a radio frequency range received by the second antenna $29_1$ into a down baseband signal DB.

The down baseband signal DB is supplied to the frame synchronization circuit $25_1$, the repeater number calculating circuit $26_1$, and the loop-back circuit $23_1$. The frame synchronization circuit $25_1$ serves to determine whether the first repeater station $R_1$ is in frame synchronization or not based on whether the down baseband signal DB contains a frame synchronization pattern FS or not, and produces a first decision signal $D_1$ indicative of the result of determination. The first decision signal $D_1$ is supplied to the repeater number calculating circuit $26_1$. The frame synchronization circuit $25_1$ generates a first frame pulse $FP_1$ in synchronism with the frame synchronization pattern FS when it determines that the first repeater station $R_1$ is in frame synchronization, and generates a first frame pulse $FP_1$ out of synchronism with the frame synchronization pattern FS when it determines that the first repeater station $R_1$ is in frame asynchronization. The first frame pulse $FP_1$ is supplied to the multiplexer $21_1$ and the repeater number calculating circuit $26_1$.

When the repeater number calculating circuit $26_1$ recognizes that the first repeater station $R_1$ is in frame synchronization based on the first decision signal $D_1$, the repeater number calculating circuit $26_1$ extracts the repeater number signal TN from the down baseband signal DB using the first frame pulse $FP_1$ as a reference, thereafter adds "1" to the repeater number $RN_0$ indicated by the repeater number signal TN, thus producing a first repeater number $RN_1$, and generates a first repeater number signal $TN_1$ representing the first repeater number $RN_1$. When the repeater number calculating circuit $26_1$ recognizes that the first repeater station $R_1$ is in frame asynchronization based on the first decision signal $D_1$, the repeater number calculating circuit $26_1$ generates a first repeater number signal $TN_1$ representing the repeater number $RN_0$ of the master station $B_0$. The first repeater number signal $TN_1$ is supplied to the multiplexer $21_1$ and the fixed delay circuit $27_1$. The multiplexer $21_1$ adds the first repeater number signal $TN_1$ to the down baseband signal DB using the first frame pulse $FP_1$ as a reference, generating a new down frame signal DF. The modulator-demodulator $22_1$ modulates an output signal from the multiplexer $21_1$ into a down signal in a radio frequency range which is transmitted through the first antenna $20_1$ to the second repeater station $R_2$. The modulator-demodulator $22_1$ also demodulates an up signal in a radio frequency range, received by the first antenna $20_1$, into an up burst signal UB which is supplied to the loop-back circuit $23_1$ and the delay adjusting circuit $28_1$.

Depending on the first loop-back control signal $RC_1$, the loop-back circuit $23_1$ supplies the down baseband signal DB as it is to the multiplexer $21_1$ or a signal composed of the down baseband signal DB and the up burst signal UB to the multiplexer $21_1$. The fixed delay circuit $27_1$ delays the first up burst signal $UB_1$ by a delay time corresponding to the repeater number indicated by the first repeater number signal $TN_1$. The delayed first up burst signal $UB_1$ is applied to the delay adjusting circuit $28_1$. The delay adjusting circuit $28_1$ adds the first up burst signal $UB_1$ to the up burst signal UB, generating a new up burst signal UB, and thereafter delays the new up burst signal UB by a delay time corresponding to the distance up to the master station $B_0$. The delayed new up burst signal UB is supplied to the second modulator-demodulator $24_1$. The second modulator-demodulator $24_1$ modulates the new up burst signal UB into an up signal in a radio frequency range which is transmitted through the second antenna $29_1$ to the master station $B_0$.

The other (n−2) repeater stations $R_2$-$R_{n-1}$ are identical in structure to the first repeater station $R_1$.

Figure 8:
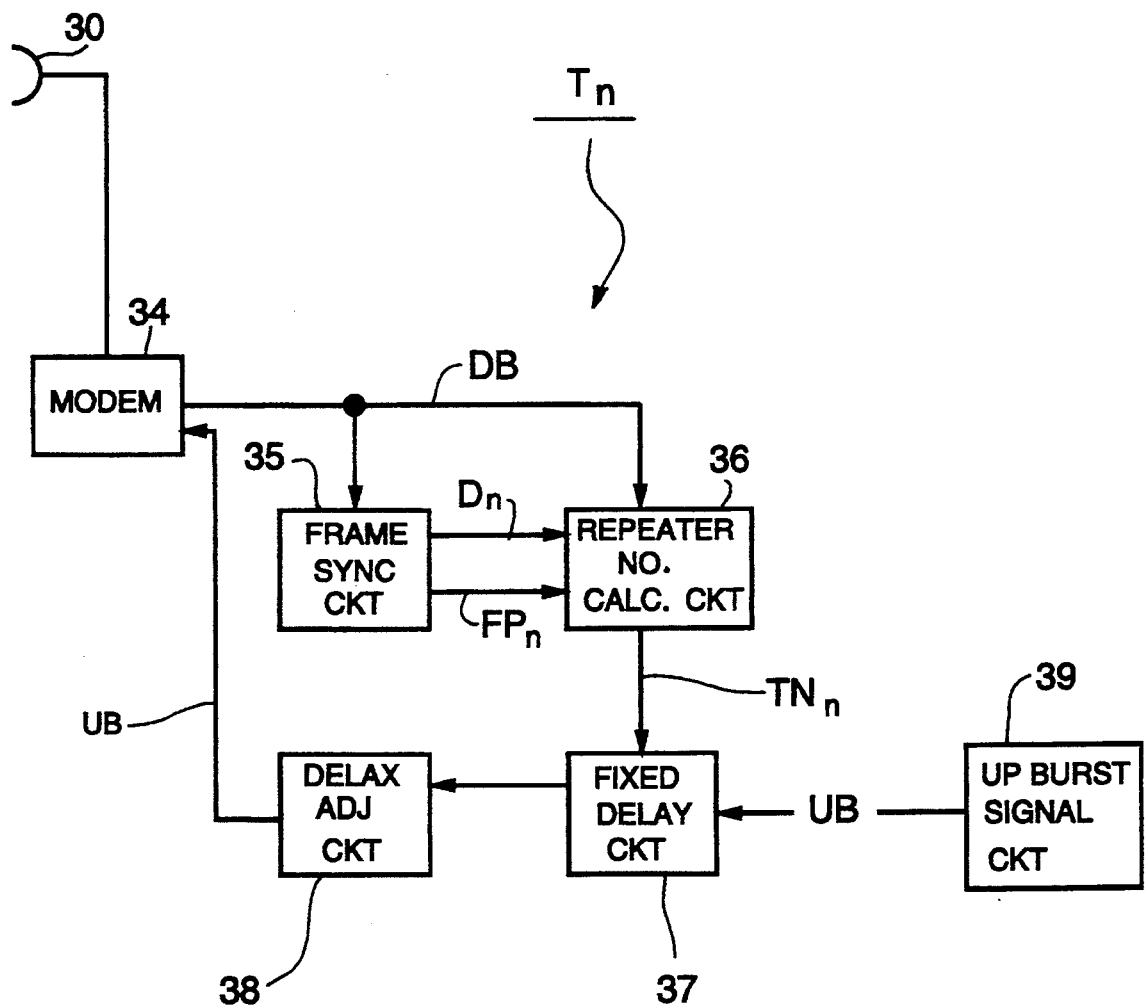
FIG. 8 is a block diagram of a slave station of the time-division multiplex communication system shown in FIG. 3.

As shown in FIG. 8, the slave station $T_n$ comprises an antenna 30, a modulator-demodulator 34, a frame synchronization circuit 35, a repeater number calculating circuit 36, a fixed delay circuit 37, a delay adjusting circuit 38, and an up burst signal generator 39 for generating an up burst signal UB. The modulator-demodulator 34 demodulates a down signal in a radio frequency range, received by the antenna 30, into a down baseband signal DB. The down baseband signal DB is supplied to the frame synchronization circuit 35 and the repeater number calculating circuit 36. The frame synchronization circuit 35 determines whether the slave station $T_n$ is in frame synchronization or not based on whether the down baseband signal DB contains a frame synchronization pattern FS or not, and produces an nth decision signal $D_n$ indicative of the result of determination. The nth decision signal $D_n$ is supplied to the repeater number calculating circuit 36. The frame synchronization circuit 35 generates an nth frame pulse $FP_n$ in synchronism with the frame synchronization pattern FS when it determines that the slave station $T_n$ is in frame synchronization, and generates an nth frame pulse $FP_n$ out of synchronism with the frame synchronization pattern FS when it determines that the slave station $T_n$ is in frame asynchronization. The nth frame pulse $FP_n$ is supplied to the repeater number calculating circuit 36.

When the repeater number calculating circuit 36 recognizes that the slave station $T_n$ is in frame synchronization based on the nth decision signal $D_n$, the repeater number calculating circuit 36 extracts the (n−1)th repeater number signal $TN_{n-1}$ from the down baseband signal DB using the nth frame pulse $FP_n$ as a reference, thereafter adds "1" to the repeater number indicated by the (n−1)th repeater number signal $TN_{n-1}$, thus producing an nth repeater number signal $TN_n$. The nth repeater number signal $TN_n$ is supplied to the fixed delay circuit 37. The fixed delay circuit 37 delays the up burst signal UB by a delay time corresponding to the nth repeater number $RN_n$ indicated by the nth repeater number signal $TN_n$. The delayed up burst signal UB is applied to the delay adjusting circuit 38. The delay adjusting circuit 38 delays the up burst signal UB by a delay time corresponding to the distance up to the (n−1)th repeater station $R_{n-1}$. The delayed up burst signal UB is supplied to the modulator-demodulator 34. The modulator-demodulator 34 modulates the up burst signal UB into an up signal in a radio frequency range which is transmitted through the antenna 30 to the (n−1)th repeater station $R_{n-1}$.

The fixed delay circuits $27_1$-$27_{n-1}$ of the repeater stations $R_1$-$R_{n-1}$ and the fixed delay circuit 37 of the slave station $T_n$ have respective fixed delay times $DL_1$-$DL_n$ which are given from the first through nth repeater numbers $RN_1$-$RN_n$, the frame period $t_F$ of the down frame signal DF, and the unit delay time $\Delta t$ according to the following equation:

$$DL_m = (n - (RN_m - RN_0)) \cdot \Delta t \quad (1)$$

where $m = 1, 2, \ldots, n-1, n$ $\Delta t = t_F/n$

Operation of the time-division multiplex communication system shown in FIG. 3 when all of the repeater stations $R_1$-$R_{n-1}$ and the slave station $T_n$ are in frame synchronization and also when the (m−1)th repeater station $R_{m-1}$ and the mth repeater station $R_m$ are in frame asynchronization, will be described below.

Figure 9:
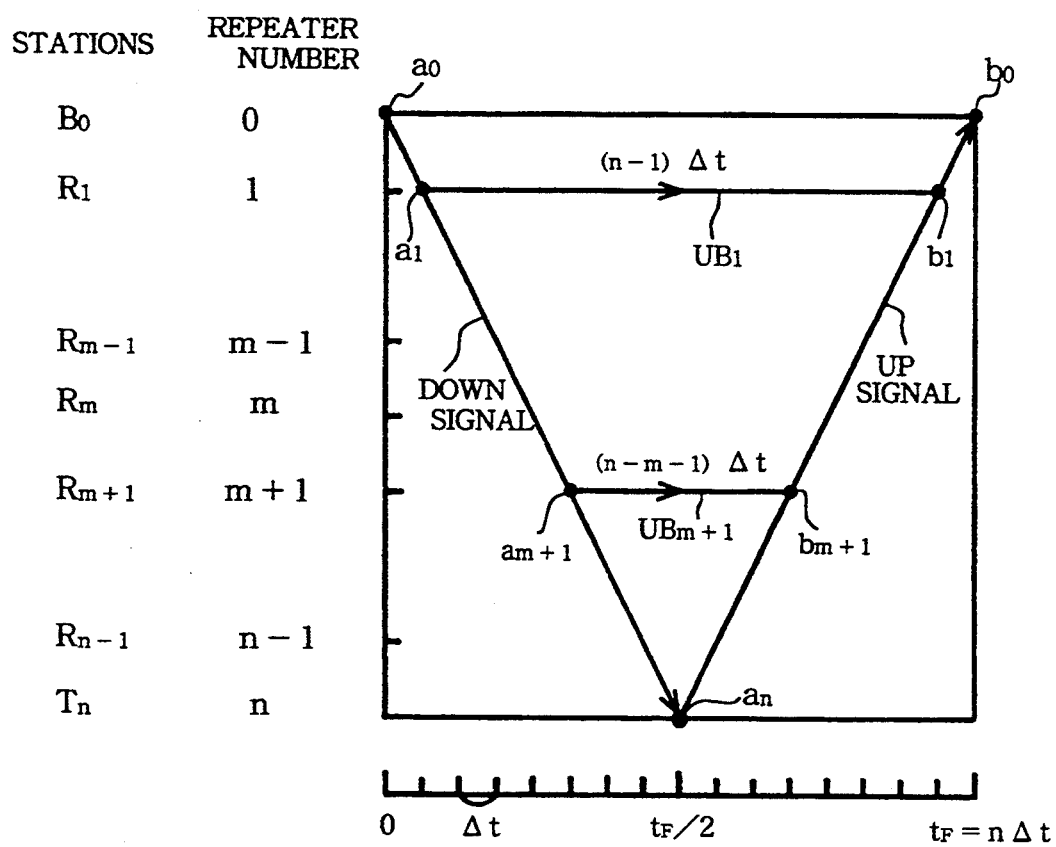
FIG. 9 is a diagram showing the manner in which the time-division multiplex communication system shown in FIG. 3 operates when all repeater and slave stations are in frame synchronization.

First, the operation at the time all of the repeater stations $R_1$-$R_{n-1}$ and the slave station $T_n$ are in frame synchronization will be described below with reference to FIG. 9. For the sake of brevity, it is assumed that the down frame signal DF and the up burst signal UB are delayed only by a distance, and the repeater stations $R_1$-$R_{n-1}$ and the slave station $T_n$ are spaced at an equivalent distance $\Delta L = L/(2 \cdot n)$ where L indicates a distance such that the time required for the down frame signal DF to travel from the master station $B_0$ to the slave station $T_n$ and subsequently for the up burst signal UB to travel from the slave station $T_n$ to the master station $B_0$ is equal to the frame period $t_F$. However, even if the actual distances between the repeater stations $R_1$-$R_{n-1}$ and the slave station $T_n$ are different from the equivalent distance $\Delta L$, no substantial difference will arise because delay time differences caused by the difference between the actual distances and the equivalent distance are adjusted by the delay adjusting circuits $28_1$-$28_{n-1}$, 38.

When the down baseband signal DB, the repeater number signal TN indicating the repeater number $RN_0 = 0$, and the frame pulse FP are applied to the multiplexer 11 in the master station $B_0$, the multiplexer 11 generates a down frame signal DF. The down frame signal DF is modulated by the modulator-demodulator 12 into a down signal in a radio frequency range. The down signal is transmitted through the antenna 14 to the first repeater station $R_1$ at a time $a_0$ (FIG. 9), and thereafter received by the second antenna $29_1$ of the first repeater station $R_1$ at a time $a_1$ which lags the time $a_0$ by a unit delay time $\Delta t$.

The down signal is demodulated into a down baseband signal DB by the second modulator-demodulator $24_1$ of the first repeater station $R_1$. The frame synchronization circuit $25_1$ detects a frame synchronization pattern FS contained in the down baseband signal DB, and supplies a first decision signal $D_1$ indicative of frame synchronization and a first frame pulse $FP_1$ synchronous with the frame synchronization pattern FS to the repeater number calculating circuit $26_1$. The repeater number calculating circuit $26_1$ extracts a repeater number signal TN contained in the down baseband signal DB using the first frame pulse $FP_1$ as a reference, and adds "1" to the repeater number $RN_0 = 0$ represented by the repeater number signal TN, thus producing a first repeater number $RN_1$. As a result, the repeater number calculating circuit $26_1$ generates a first repeater number signal $TN_1$ indicative of the first repeater number $RN_1 = 1$. The first repeater number signal $TN_1$ is supplied to the fixed delay circuit $27_1$ whose fixed delay time $DL_1$ is set to $(n-1) \cdot \Delta t$ according to the equation (1). To transmit a first up burst signal $UB_1$ from the first repeater station $R_1$ back to the master station $B_0$, therefore, the first up burst signal $UB_1$ is delayed to a time $b_1$ by the fixed delay circuit $27_1$, and thereafter supplied to the delay adjusting circuit $28_1$. The delay adjusting circuit $28_1$ adds the up burst signal UB from the modulator-demodulator $22_1$ and the first up burst signal $UB_1$, generating a new up burst signal UB. The new up burst signal UB is adjusted with respect to the delay time by the delay adjusting circuit $28_1$ so that it is received by the master station $B_0$ at a time $b_0$. As a consequence, the up burst signal UB is received by the master station $B_0$ such that the up frame UF of the up burst signal UB shown in FIG. 6 and the frame synchronization pattern FS of the down frame signal DF shown in FIG. 5 are timed to each other, i.e., they occur at the same time. The multiplexer $21_1$ adds the first repeater number signal $TN_1$ to the down baseband signal DB using the first frame pulse $FP_1$ as a reference, generating a new down frame signal DF. The new down frame signal DF is then modulated by the modulator-demodulator $22_1$ into a down signal in a radio frequency range which is transmitted through the first antenna $20_1$ to the second repeater station $R_2$.

The remaining repeater stations $R_2$-$R_{n-1}$ operate in the same manner as the first repeater station $R_1$. More specifically, the down signal in a radio frequency range transmitted from the mth repeater station $R_m$ is received by the second antenna $29_{m+1}$ of the (m+1)th repeater station $R_{m+1}$ at a time $a_{m+1}$ which lags the time $a_0$ by the unit delay time $\Delta t$ multiplied by (m+1). The received down signal is then demodulated into an mth down baseband signal $DB_m$ by the second modulator-demodulator $24_{m+1}$ of the (m+1)th repeater station $R_{m+1}$. The frame synchronization circuit $25_{m+1}$ detects a frame synchronization pattern FS contained in the mth down baseband signal $DB_m$, and supplies an (M+1)th decision signal $D_{m+1}$ indicative of frame synchronization and an (M+1)th frame pulse $FP_{m+1}$ synchronous with the frame synchronization pattern FS to the repeater number calculating circuit $26_{m+1}$. The repeater number calculating circuit $26_{m+1}$ extracts an mth repeater number signal $TN_m$ contained in the mth down baseband signal $DB_m$ using the (M+1)th frame pulse $FP_{m+1}$ as a reference, and adds "1" to the mth repeater number $RN_m = m$ represented by the mth repeater number signal $TN_m$, thus producing an (M+1)th repeater number $RN_{m+1}$. As a result, the repeater number calculating circuit $26_{m+1}$ generates an (M+1)th repeater number signal $TN_{m+1}$ indicative of the (M+1)th repeater number $RN_{m+1} = m+1$. The (M+1)th repeater number signal $TN_{m+1}$ is supplied to the fixed delay circuit $27_{m+1}$ whose fixed delay time $DL_{m+1}$ is set to $(n-m-1).\Delta t$ according to the equation (1). To transmit an (M+1)th up burst signal $UB_{m+1}$ from the (M+1)th repeater station $R_{m+1}$ back to the master station $B_0$, therefore, the (M+1)th up burst signal $UB_{m+1}$ is delayed to a time $b_{m+1}$ by the fixed delay circuit $27_{m+1}$, and thereafter supplied to the delay adjusting circuit $28_{m+1}$. The delay adjusting circuit $28_{m+1}$ adds the up burst signal UB from the modulator-demodulator $22_{m+1}$ and the (M+1)th up burst signal $UB_{m+1}$, generating a new up burst signal UB. The new up burst signal UB is adjusted with respect to the delay time by the delay adjusting circuit $28_{m+1}$ so that it is received by the master station $B_0$ at a time $b_0$. As a consequence, the up burst signal UB is received by the master station $B_0$ such that the up frame UF of the up burst signal UB and the frame synchronization pattern FS of the down frame signal DF are timed to each other. The multiplexer $21_{m+1}$ adds the (M+1)th repeater number signal $TN_{m+1}$ to the mth down baseband signal $DB_m$ using the (M+1)th frame pulse $FP_{m+1}$ as a reference, generating a new down frame signal DF. The new down frame signal DF is then modulated by the modulator-demodulator $22_{m+1}$ into a down signal in a radio frequency range which is transmitted through the first antenna $20_{m+1}$ to the (m+2)th repeater station $R_{m+2}$.

In the slave station $T_n$, the down signal in a radio frequency range transmitted from the (n−1)th repeater station $R_{n-1}$ is received by the antenna 30 at a time $a_n$ which lags the time $a_0$ by the unit delay time $\Delta t$ multiplexed by n. The received down signal is then demodulated into a down baseband signal DB by the modulator-demodulator 34. The frame synchronization circuit 35 detects a frame synchronization pattern FS contained in the down baseband signal DB, and supplies an nth decision signal $D_n$ indicative of frame synchronization and an nth frame pulse $FP_n$ synchronous with the frame synchronization pattern FS to the repeater number calculating circuit 36. The repeater number calculating circuit 36 extracts an (n−1)th repeater number signal $TN_{n-1}$ contained in the down baseband signal DB using the nth frame pulse $FP_n$ as a reference, and adds "1" to the (n−1)th repeater number $RN_{n-1} = n-1$ represented by the (n−1)th repeater number signal $TN_{n-1}$, thus producing an nth repeater number $RN_n$. As a result, the repeater number calculating circuit 36 generates an nth repeater number signal $TN_n$ indicative of the nth repeater number $RN_n = n$. The nth repeater number signal $TN_n$ is supplied to the fixed delay circuit 37 whose fixed delay time DLn is set to "0" according to the equation (1). To transmit an up burst signal UB from the slave station $T_n$ back to the master station $B_0$, therefore, the up burst signal UB is supplied to the delay adjusting circuit 38 without being delayed. The delay adjusting circuit 38 adjusts the delay time of the up burst signal UB so that it is received by the master station $B_0$ at a time $b_0$. As a consequence, the up burst signal UB is received by the master station $B_0$ such that the up frame UF of the up burst signal UB and the frame synchronization pattern FS of the down frame signal DF are timed to each other. The new down frame signal DF is modulated by the modulator-demodulator 34 into an up signal in a radio frequency range which is transmitted through the antenna 30 to the (n−1)th repeater station $R_{n-1}$.

Figure 10:
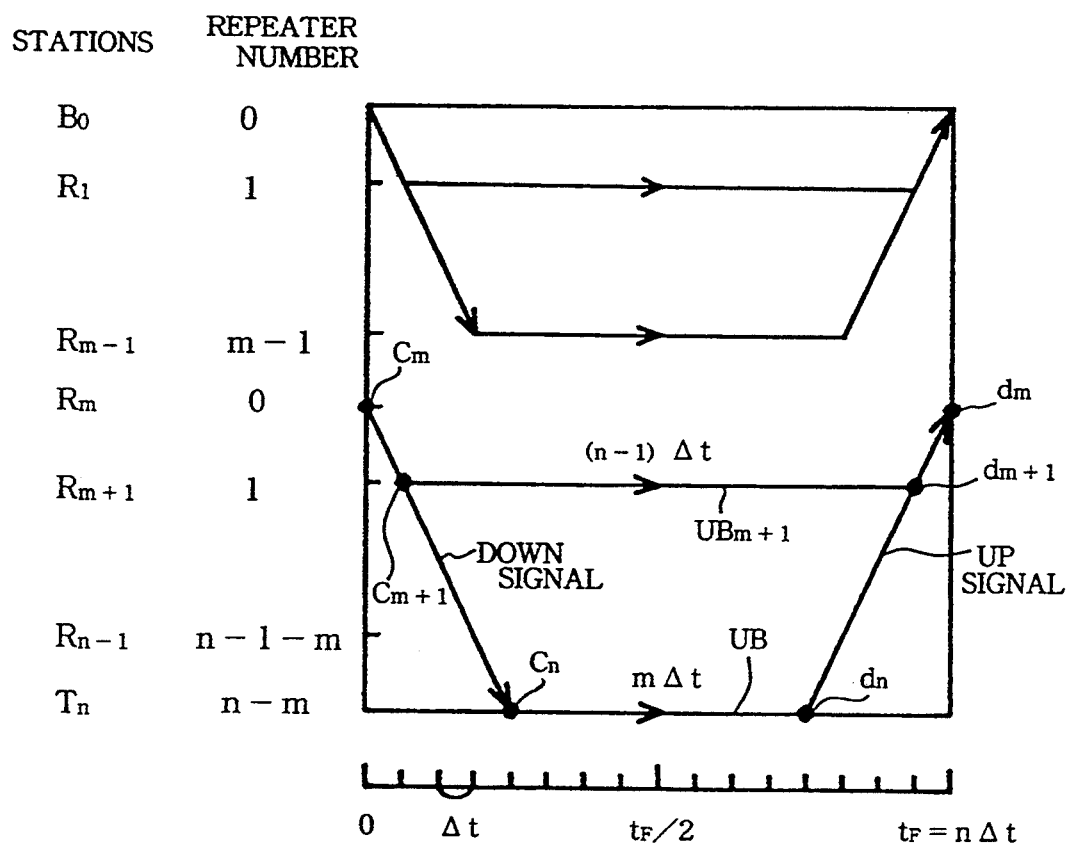
FIG. 10 is a diagram showing the manner in which the time-division multiplex communication system shown in FIG. 3 operates when an (m−1)th repeater station and an mth repeater station are in frame asynchronization.

The operation at the time the (m−1)th repeater station $R_{m-1}$ and the mth repeater station $R_m$ are in frame asynchronization will be described below with reference to FIG. 10.

Communication from the master station $B_0$ to the (m−1)th repeater station $R_{m-1}$ is carried out in the same manner as described above where all of the repeater stations $R_1$-$R_{n-1}$ and the slave station $T_n$ are in frame synchronization. However, since the mth repeater station $R_m$ is unable to receive a down signal in a radio frequency range from the (m−1)th repeater station $R_{m-1}$, the frame synchronization circuit $25_m$ does not detect a frame synchronization pattern FS. Consequently, the frame synchronization circuit $25_m$ supplies an mth decision signal $D_m$ indicating frame asynchronization and an mth frame pulse $FP_m$ asynchronous with the frame synchronization pattern FS to the repeater number calculating circuit $26_m$. Inasmuch as the mth decision signal $D_m$ indicates frame asynchronization, the repeater number calculating circuit $26_m$ sets the mth repeater number $RN_m$ to "0" which is the repeater number $RN_0$ of the master station $B_0$, and hence generates an mth repeater number signal $TN_m$ indicative of the mth repeater number $RN_m = $ "0". The mth repeater number $RN_m$ is then supplied to the multiplexer $21_m$, which adds the same to the frame synchronization pattern FS using the mth frame pulse $FP_m$ as a reference, generating a new down frame signal DF. The new down frame signal DF is modulated by the modulator-demodulator $22_m$ into a down signal in a radio frequency range which is transmitted through the antenna $20_m$ to the (M+1)ah repeater station $R_{m+1}$.

In the (M+1)th repeater stations $R_{m+1}$, the down signal in a radio frequency range transmitted from the mth repeater station $R_m$ is received by the second antenna $29_{m+1}$ at a time $C_{m+1}$ which lags a time $c_m$ (see FIG. 10) by the unit delay time $\Delta t$. The received down signal is then demodulated into an mth down baseband signal $DB_m$ by the second modulator-demodulator $24_{m+1}$. The frame synchronization circuit $25_{m+1}$ detects a frame synchronization pattern FS contained in the mth down baseband signal $DB_m$, and supplies an (M+1)th decision signal $D_{m+1}$ indicative of frame synchronization and an (M+1)th frame pulse $FP_{m+1}$ synchronous with the frame synchronization pattern FS to the repeater number calculating circuit $26_{m+1}$. The repeater number calculating circuit $26_{m+1}$ extracts an mth repeater number signal $TN_m$ contained in the mth down baseband signal $DB_m$ using the (M+1)th frame pulse $FP_{m+1}$ as a reference, and adds "1" to the mth repeater number $RN_m=0$ represented by the mth repeater number signal $TN_m$, thus producing an (M+1)th repeater number signal $TN_{m+1}$ indicative of an (M+1)th repeater number $RN_{m+1}=1$. The (M+1)th repeater number signal $TN_{m+1}$ is supplied to the fixed delay circuit $27_{m+1}$ whose fixed delay time $DL_{m+1}$ is set to $(n-1).\Delta t$ according to the equation (1). To transmit an (M+1)th up burst signal $UB_{m+1}$ from the (M+1)th repeater station $R_{m+1}$ back to the mth repeater station $R_m$, therefore, the (M+1)th up burst signal $UB_{m+1}$ is delayed to a time $d_{m+1}$ by the fixed delay circuit $27_{m+1}$, and thereafter supplied to the delay adjusting circuit $28_{m+1}$. The delay adjusting circuit $28_{m+1}$ adds the up burst signal UB from the modulator-demodulator $22_{m+1}$ and the (M+1)th up burst signal $UB_{m+1}$, generating a new up burst signal UB. The new up burst signal UB is adjusted with respect to the delay time by the delay adjusting circuit $28_{m+1}$ so that it is received by the mth repeater station $R_m$ at a time $d_m$. As a consequence, the up burst signal UB is received by the mth repeater station $R_m$ such that the up frame UF of the up burst signal UB and the frame synchronization pattern FS of the down frame signal DF are timed to each other. The multiplexer $21_{m+1}$ to the mth down baseband signal $DB_m$ using the (M+1)th frame pulse $FP_{m+1}$ as a reference, generating a new down frame signal DF. The new down frame signal DF is then modulated by the modulator-demodulator $22_{m+1}$ into a down signal in a radio frequency range which is transmitted through the first antenna $20_{m+1}$ to the (m+2)th repeater station $R_{m+2}$.

In the slave station $T_n$, the down signal in a radio frequency range transmitted from the (n−1)th repeater station $R_{n-1}$ is received by the antenna 30 at a time $c_n$ which lags the time $c_n$ by the unit delay time $\Delta t$ multiplied by (n−m). The received down signal is then demodulated into a down baseband signal DB by the modulator-demodulator 34. The frame synchronization circuit 35 detects a frame synchronization pattern FS contained in the down baseband signal DB, and supplies an nth decision signal $D_n$ indicative of frame synchronization and an nth frame pulse $FP_n$ synchronous with the frame synchronization pattern FS to the repeater number calculating circuit 36. The repeater number calculating circuit 36 extracts an (n−1)th repeater number signal $TN_{n-1}$ contained in the down baseband signal DB using the nth frame pulse $FP_n$ as a reference, and adds "1" to the (n−1)th repeater number $RN_{n-1}=n-m-1$ represented by the (n−1)th repeater number signal $TN_{n-1}$, thus producing an nth repeater number $RN_n$. As a result, the repeater number calculating circuit 36 generates an nth repeater number signal $TN_n$ indicative of the nth repeater number $RN_n=n-m$. The nth repeater number signal $TN_n$ is supplied to the fixed delay circuit 37 whose fixed delay time DLn is set to $m.\Delta t$ according to the equation (1). To transmit an up burst signal UB from the slave station $T_n$ back to the mth repeater station $R_m$, therefore, the up burst signal UB is delayed to a time $d_n$ by the fixed delay circuit 37 and supplied to the delay adjusting circuit 38. The delay adjusting circuit 38 adjusts the delay time of the up burst signal UB so that it is received by the mth repeater station $R_m$ at a time $d_m$. As a consequence, the up burst signal UB is received by the mth repeater station $R_m$ such that the up frame UF of the up burst signal UB and the frame synchronization pattern FS of the down frame signal DF are timed to each other. The new down frame signal DF is modulated by the modulator-demodulator 34 into an up signal in a radio frequency range which is transmitted through the antenna 30 to the (n−1)th repeater station $R_{n-1}$.

Therefore, even when the (m−1)th repeater station $R_{m-1}$ and the mth repeater station $R_m$ are in frame asynchronization, a network with the mth repeater station $R_m$ as a virtual master station can be set up by operating the loop-back circuit $23_m$ of the mth repeater station $R_m$. Since the mth repeater station $R_m$ receives the up burst signal UB such that the up frame UF of the up burst signal UB and the frame synchronization pattern FS of the down frame signal DF are timed to each other, the down frame signal DF and the up burst signal can be added to each other without delaying the up burst signal UB.

The illustrated embodiment is particularly directed to a time-division multiplex communication system which comprises master, repeater, and slave stations that are connected in series to each other. However, the principles of the present invention are more practical and advantageous when embodied in a time-division multiplex communication system comprising master, repeater, and slave stations that are connected in a hierarchical network.

While this invention has been described in conjunction with the preferred embodiments thereof, it would now be possible for any person skilled in the art to readily put this invention into practice in various other ways.

What is claimed is:

1. A time-division multiplex communication system comprising:
   a master station for transmitting a first down frame signal accompanied by a predetermined first repeater number;
   a group of repeater stations each for transmitting a second down frame signal accompanied by a second repeater number, at least one of the repeater stations being connected to the master station for receiving the first down frame signal from the master station; and
   a group of slave stations each for transmitting an up burst signal which is delayed by a fixed delay time corresponding to a third repeater number that is calculated by adding a predetermined number to a second repeater number transmitted from a repeater station which is a master with respect thereto;

said master station, group of repeater stations, and group of slave stations being connected at different layers in an hierarchical network such that said master station is connected to at least one of said group of repeater stations, each repeater station of said group of repeater stations is connected to at least one other repeater station of said group of repeater stations or one of the slave stations of said group of slave stations and each slave station of said group of slave stations is connected to at least one of said group of repeater stations;

each one of said group of repeater stations comprising:

frame synchronization determining means for determining whether said one of said group of repeater stations is in frame synchronization or frame asynchronization;

loop-back means for looping back said up burst signal transmitted from either one of said group of slave stations connected to said one of said group of repeater stations and which is a slave thereto or another of said group of repeater stations connected to said one of said group of repeater stations and which is a slave with respect thereto, when said frame synchronization determining means determines that said one of said group of repeater stations is in frame asynchronization; and repeater number calculating means for calculating a second repeater number thereof depending on a number of layers from said master station based on said first repeater number when said frame synchronization determining means determines that said one of said group of repeater stations is in frame synchronization, and for making said second repeater number equal to said first repeater number irrespective of said number of layers from said master station when said frame synchronization determining means determines that said one of said group of repeater stations is in frame synchronization.

2. A time-division multiplex communication system according to claim 1, wherein said first repeater number is "0,"

said repeater number calculating means calculating said second repeater number thereof by adding "1" to either said first repeater number transmitted from said master station or a second repeater number transmitted from another of said group of repeater stations which is a master with respect thereto, when said frame synchronization determining means determines that said one of said group of repeater stations is in frame synchronization;

each of said group of slave stations comprising means for calculating said third repeater number by adding "1" to said second repeater number transmitted from said group of repeater stations which is a master with respect thereto.

3. A time-division multiplex communication system according to claim 1 or 2, wherein each of said slave stations includes fixed delay means for delaying said up burst signal transmitted from said one of said group of repeater stations connected to said station by a fixed delay time which is expressed by:

$$DL_n = (n - (RN_n - RN_0)) \cdot t_F / n$$

where $t_F$ is a frame period of said first frame signal, n is a maximum number of layers from said master station to said each slave station, $RN_0$ is said first repeater number, and $RN_n$ is said third repeater number.

4. A time-division multiplex communication system according to claim 3, wherein each of said group of slave stations further includes delay adjusting means for delaying said up burst signal inputted from said fixed delay means by a delay time corresponding to a distance from said another of said group of repeater stations which is a master with respect thereto.

5. A time-division multiplex communication system according to claim 1 or 2, wherein each of said repeater stations comprises:

up burst signal generating means for generating a second up burst signal;

second fixed delay means for delaying said second up burst signal generated by said up burst signal generating means by a second fixed delay time corresponding to said second repeater time; and up burst multiplexing means for multiplexing either said delayed second up burst signal inputted from said fixed delay means to either said up burst signal transmitted from said one of said slave stations connected to said each repeater station and which is a slave with respect thereto or said up burst signal transmitted from said another of said repeater stations connected to said each repeater station and which is a slave with respect thereto, thereby producing a new up burst signal.

6. A time-division multiplex communication system according to claim 5, wherein said fixed delay means comprises means for delaying said up burst signal by a fixed delay time $DL_m$ which is expressed by:

$$DL_m = (n - (RN_m - RN_0)) \cdot t_F / n$$

where $t_F$ is a frame period of said first down frame signal, n is a maximum number of layers from said master station to one of said group of slave stations, $RN_0$ is said first repeater number, and $RN_m$ is said second repeater number.

7. A time-division multiplex communication system according to claim 5, wherein said up burst signal multiplexing means comprises second delay adjusting means for delaying said new up burst signal by a delay time depending on a distance from either master station or said another of said group of repeater stations which is a master with respect thereto.

* * * * *